March 11, 1958 W. EVANS Re. 24,444

REFRIGERATING PACKAGE

Original Filed Jan. 31, 1950 2 Sheets-Sheet 1

Inventor
Wil Evans;
By R. S. Burns
Attorney

REFRIGERATING PACKAGE

Original Filed Jan. 31, 1950 2 Sheets-Sheet 2

Inventor
Wil Evans:
By R. S. Berry
Attorney

United States Patent Office

Re. 24,444
Reissued Mar. 11, 1958

24,444

REFRIGERATING PACKAGE

Wil Evans, Oakland, Calif., assignor to Mrs. Ruby Alice Hodsell

Original No. 2,619,801, dated December 2, 1952, Serial No. 141,565, January 31, 1950. Application for reissue April 27, 1954, Serial No. 426,059

11 Claims. (Cl. 62—1)

Matter enclosed in heavy brackets [ ] appears in the original patent but forms no part of this reissue specification; matter printed in italics indicates the additions made by reissue.

This invention relates to a package which is adapted to be formed into a refrigerating element suitable for use in effecting refrigeration of perishables with which it is packed and for reducing the temperature of compartments in which it is housed.

The primary object of the invention is to provide a prefabricated package adapted to be utilized in the production of a refrigerating element of the above character as needed, by the addition thereto of a freezable liquid and subsequent freezing thereof, the purpose of the invention being to provide a dry product of room temperature which may be readily and economically transported to a place where the required liquid may be added and freezing thereof effected, thereby obviating transportation of the liquid with the product and the objections incident thereto, such as the cost of such conveyance, inconvenience in handling, and the necessity of packing the product in a manner to avoid loss of the liquid during shipment preliminary to freezing thereof.

Another object is to provide an element embodying a flexible waterproof container having a dry fibrous water absorptive material confined therein and which is adapted to be transported and shipped and to being subsequently supplied with a freezable liquid, and subjected to refrigeration to freeze its contents, as desired.

Another object is to provide a container of the above character in which a dry water absorptive material in a granular form, such as sawdust, is confined in an inner bag-like tube formed of flexible sheet material which is impervious to water and which tube is capable of holding water and of being sealed to confine water therein, and in which such tube is jacketed in a thin walled flexible outer casing formed of tough fibrous material, such as paper, by which the inner tube is protected against abrasional wear and puncturing during handling and shipment thereof.

A further object is to provide a refrigerating package embodying an inner flexible tube constituting a refrigerant container and an outer flexible reinforcing casing enveloping the inner tube, in which the tube and casing are each closed at one end and open at the other end and have their open end portions formed so that the open end of the inner tube may be sealed within the open end of the casing and such ends be collectively folded to form a reinforced rib across the upper margin of the package capable of being utilized as a handle whereby the package may be readily picked up and carried.

With the foregoing objects in view together with such other objects and advantages as may subsequently appear the invention resides in the parts and in the combination, construction and arrangement of parts hereinafter described and claimed, and illustrated by way of example in the accompanying drawing in which:

Figure 1:
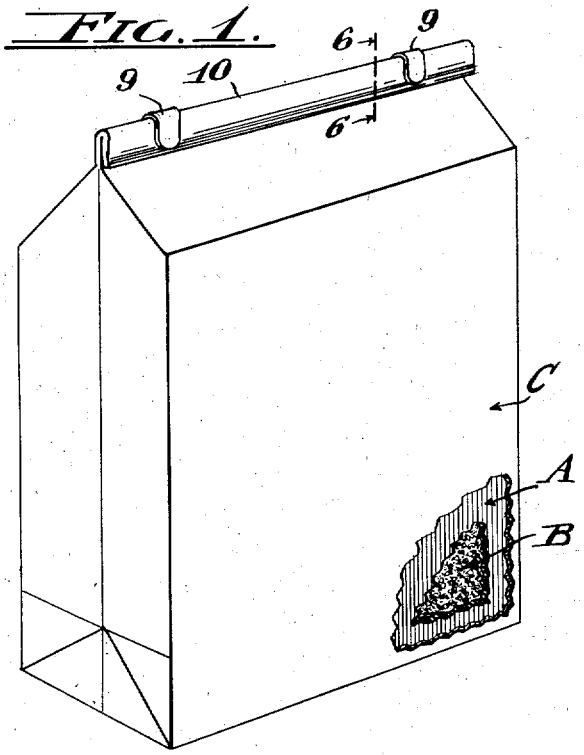
Fig. 1 is a perspective view of one form of the package as prepared for shipment preliminary to adding liquid thereto and effecting freezing thereof.

Referring to the drawing more specifically A indicates generally an inner tube or bag which is open at one end and is closed at its other end in any suitable manner as by bringing the overlying end portions of the walls of the tube together and adhering them to each other by means of a suitable adhesive, or by pressing the walls together while applying heat thereto such as to effect cohesion of the contiguous or abutting surfaces of the material. The tube A is formed of a flexible material impervious to moisture such as oiled or waxed paper, a sheet cellulose product, or latex. A quantity of dry granular water absorptive material B, such as sawdust, is placed in the tube A and where it is desired to produce a brine within the tube by the addition of water thereto, a quantity of salt is mixed with the dry material B and placed within the tube.

A bag C formed of flexible fibrous material, such as paper, envelops the tube A to provide a wear resistant stabilizing housing for the tube A and to afford a protective sheath for the latter to minimize accidental puncturing thereof, thereby protecting the tube against wear and leakage.

The bag C may comprise a conventional paper bag into which the tube A may be loosely inserted. The bag C has an open upper end portion 7 which is adapted to be folded upon itself together with the open end portion 8 of the tube A to temporarily close the latter as shown in Figs. 2 and 9 and to connect the tube and bag together.

Figure 2:
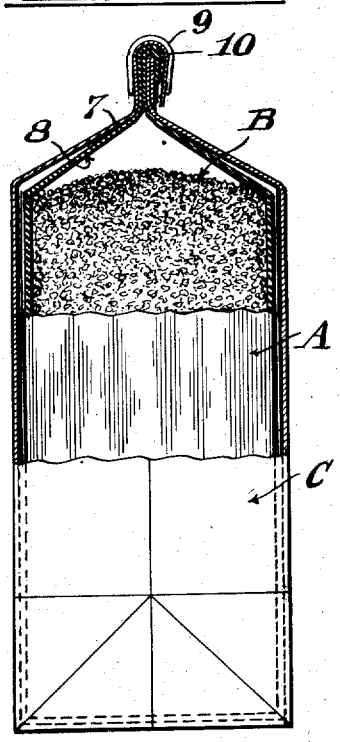
Fig. 2 is a view of the package shown in Fig. 1 partly in end elevation with parts broken away and portions shown in section.
Figure 6:
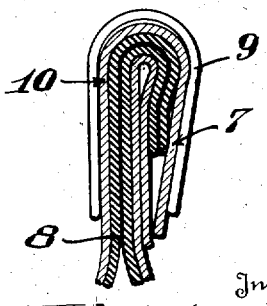
Fig. 6 is an enlarged detail in section taken on the line 6—6 of Fig. 1 showing the manner of folding the upper margin of the inner tube and outer casing in sealing the open ends thereof and in forming the handle on the package.
Figure 7:
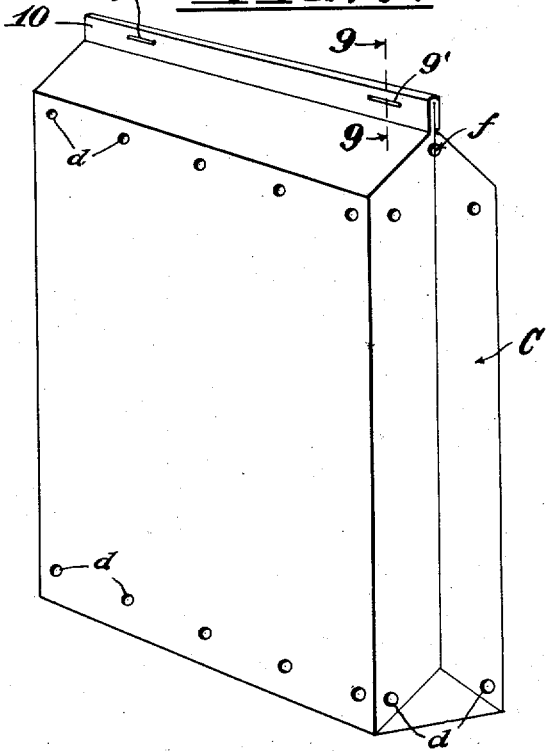
Fig. 7 is a perspective view depicting another form of the package.
Figure 8:
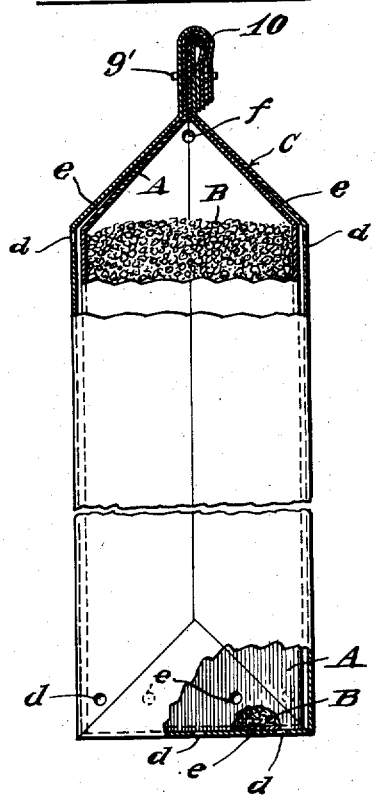
Fig. 8 is a view in end elevation of the package shown in Fig. 7, with parts broken away and portions shown in section.
Figure 9:
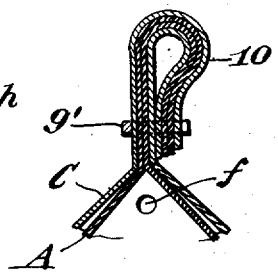
Fig. 9 is an enlarged detail in section taken on the line 9—9 of Fig. 7.

As a means for holding the folded end portions of the bag C and tube A in the folded positions removable clips 9 may be positioned astride thereof as shown in Figs. 1, 2 and 6, or the folded end portions may be secured together by means of wire staples 9′ in conventional fashion as shown in Figs. 7, 8 and 9.

In the form of the invention shown in Figs. 1 to 6 inclusive, the package is designed to be opened at its upper end to give access to the interior thereof whereby a freezable liquid may be readily poured into the tube A to saturate the dry absorptive material B, after which the open end of the bag may be again closed, while in the modified form of the invention shown in Figs. 7 to 9 inclusive the package is provided with small perforations d and e formed in the bag C and inner tube A respectively to permit the introduction of freezable liquid into the inner tube by submerging the package in the liquid, whereby the dry content of the package may be saturated without opening the upper end of the package. In the latter instance the perforations d and e may be formed in the bag C and tube A at various points throughout the walls thereof according to the size of the package. The perforations d and e may be in register or may be offset relative to each other as occasion may require.

Figure 3:
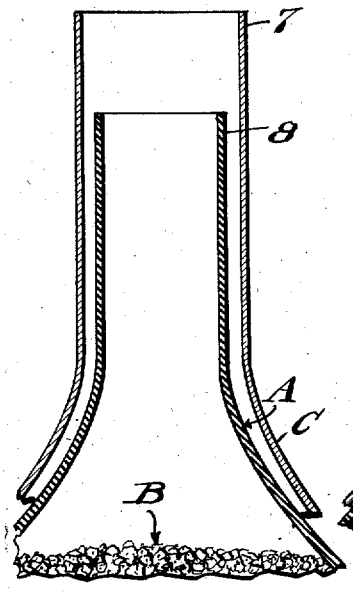
Fig. 3 is a detail diagram of the upper portion of the package showing the inner tube and casing thereof as opened in readiness to receive a freezable liquid.
Figure 4:
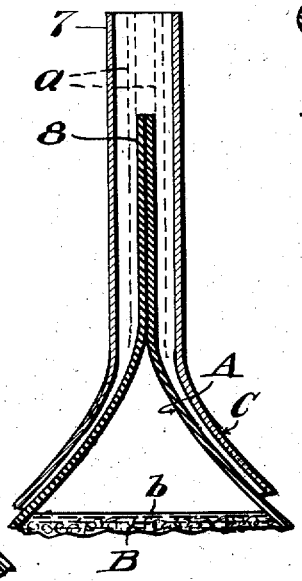
Fig. 4 is a diagram similar to Fig. 3 showing the manner of initially closing the package and sealing the inner tube after placing the freezable liquid therein.
Figure 5:
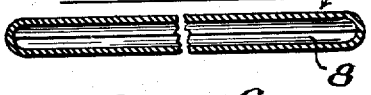
Fig. 5 is a diagram in horizontal section of the inner tube illustrating the manner of sealing an end thereof.

The package formed as above described comprises a product or article of manufacture which is intended for use in the production of a refrigerating element and is designed for shipment or transportation to a point of use remote from its place of assemblage where it is to be converted into a refrigerating element by placing a quantity of water or other freezable liquid within the tube A to saturate the material B and then freezing the mixture confined in the tube. To accomplish this with the form of the invention shown in Figs. 1 to 6 the bag C and tube B are opened at the place where the addition of the liquid is to be effected by removing the clips 9 and unfolding the open end portions of the bag and tube as indicated in Fig. 3, whereupon a measured quantity of the liquid b is introduced into the open end of the tube. On this being done the open end of the tube A is sealed by adhering opposed side portions thereof together as before described and as shown in Figs. 4 and 5. The opposed sides of the open end portion of the bag C are then brought against the sealed end portion of the bag as indicated by the dotted lines a in Fig. 4 whereupon the open end portion 7 of the bag C together with the then sealed end portion 8 of the tube A are refolded in overlying relation as shown in Fig. 6. The clips 9 are then reapplied to hold the folds in place. By thus closing the open end of the bag C a ridge 10 is produced which will serve as a handhold by which the product may be readily grasped and carried.

To saturate the dry content of the perforated package shown in Figs. 7 to 9 inclusive, the package is submerged in a body of water or other freezable liquid in such fashion that the liquid will pass through the perforations d and e and enter the tube A. During this operation the air content of the tube A displaced by the incoming liquid will escape through such of the perforations d and e as are in the uppermost walls of the package. In order to facilitate venting of air from the tube A when the package is submerged while in an upright position, vent openings f are formed to lead through the walls of the bag C and tube A between the top of the body of granular absorption material B and the closed end of the package. On saturation of the material B in the tube A, excess liquid may be drained from the package on removing it from the liquid in which it was submerged.

The liquid in the bag and tube is then frozen thus forming a cake of ice reinforced by the fibrous granular material B then imbedded therein, and sheathed within the tube A and the protective bag C. The resultant refrigerating element may be utilized in effecting a cooling action wherever desired. It may be placed with perishable products such as fruits, flowers, meats and the like, being especially useful in the shipment of such products. It may also be employed in effecting cooling of a compartment in which it is placed, such as in cooling cabinets. In fact it may be utilized in various places where ice and Dry-Ice are commonly employed with the advantage that water resulting from melting of the frozen content of the tube A in the form of the invention shown in Figs. 1 to 6 will be confined within the latter and will thereby be prevented from saturating materials with which the element is associated. In the form of the invention shown in Figs. 7 to 9, it is contemplated that the package contain only such liquid as will be absorbed by the material B so that on melting thereof no liquid or at least no appreciable amount thereof will pass from the package through the perforations e—f. Manifestly liquid within the package resulting from melting of the ice block may be refrozen if desired.

The package may be re-used repeatedly without refilling, but additional liquid may be added as above specified if need be and as occasion may require. It has heretofore been a practice to produce refrigerating pads consisting of a container in which is packed sawdust and a quantity of freezable liquid such as water or brine, and to transport such pads to places of use where the liquid is frozen to produce the desired refrigerating elements. The present invention affords a construction whereby shipment of liquid therewith may be eliminated and also provides a strong and durable package which may be readily handled and transported either before the addition of liquid thereto or after being frozen; the handle 10 affording a convenient means for grasping and carrying the package in a suspended position.

Figure 10:
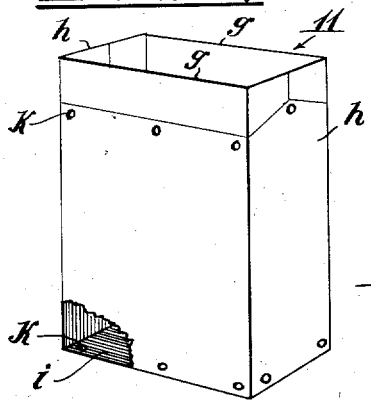
Fig. 10 is a perspective view with portions broken away showing a modified form of the invention.

For example while the invention as above described involves the employment of a waterproof tube contained in a protective paper bag, either perforated or imperforate, it also contemplates the use of a perforated bag D formed of one or more plies of paper, as indicated in Fig. 10; whereby the side, end and bottom walls g, h and i of the bag formed of a single sheet of paper. The bag thus formed is rendered waterproof by coating it with a plastic adhesive or other suitable waterproofing material, and is formed with perforations k whereby water may enter a closed bag on submergence thereof to saturate the dry absorptive material contained therein and whereby any free water within the bag may be drained therefrom so that its only water content will be that held by the absorbent material contained in the bag.

While I have shown and described a specific embodiment of my invention, I do not limit myself to the exact details of construction set forth, and the invention embraces such changes, modifications and equivalents of the parts and their formation and arrangement as come within the purview of the appended claims.

I claim:

1. A package for forming a refrigerating element comprising a bag having an open end portion, a liquid impervious tube enveloped by said bag having a closed end and an open end, said tube being disposed with its open end within the open end portion of said bag and spaced inwardly from the open end of the bag, a body of dry liquid absorptive fibrous material in said tube spaced inwardly from the open end of said tube; the open ends of said bag and tube being collectively foldable to temporarily close same in spaced relation to said material, and clamping means for releasably holding said folded ends in their closed position.

2. A package for forming a refrigerating element comprising a tube formed of flexible water impervious material having a water tight closed end and an open end, a body of dry water absorptive granular material in said tube partly filling same in spaced relation to the open end thereof, a protective paper bag enveloping said tube having an open end portion, said tube being arranged within said bag with its open end disposed in the open end portion of said bag; the open end portions of said bag and tube being collectively folded in a return bend and adapted to be opened to permit placement of a freezable liquid within said tube through the open end thereof; the open end of said tube being adapted to be sealed within said bag to confine liquid in the tube; and removable clamping means for closing the folded open end portion of said bag and for confining the sealed tube therewithin.

3. A package for forming a refrigerating element comprising a tube, a body of dry liquid absorptive fibrous material and salt confined in said tube, a protective bag enveloping said tube, said tube and bag being perforated to admit liquid to the interior of said tube on submersion of the package in such liquid, and having a vent for the escape from the interior of the package of air displaced by liquid entering the package.

4. A package for forming a refrigerating element comprising a tube; a body of dry granular liquid-absorptive material confined in said tube, and a protective paper bag enveloping said tube; said tube and bag being formed with perforations for admitting liquid into the interior of said tube on submerging the bag therein, and said tube and bag being formed with registering openings above the body of granular material within the tube for venting air displaced by liquid entering the tube through said perforations.

5. A package for forming a refrigerating element comprising a bag having side, end and bottom walls, and an open end, a body of dry granular liquid absorptive material confined in said bag in spaced relation to said open end, said bag having its open end folded in a return bend, said bag being formed with perforations for admitting liquid into the interior thereof upon submerging the bag in such liquid and for draining liquid from the bag in excess of that held by the absorptive material therein contained, and a removable fastener holding the open end of the bag in a closed condition.

6. A package for forming a refrigerating element comprising a tube formed of flexible water impervious material having a closed end and an open end, a body of dry water absorptive granular material within said tube partly filling same in spaced relation to the open end thereof, a protective paper bag enveloping said tube having a closed end and an open end, said tube being arranged within said bag with its open end disposed within the open end of said bag; the portions of said bag and tube at the open ends thereof being collectively folded in a return bend, clamping means engaging the opposite sides of the folded return bend to releasably hold the bend in its folded position, said tube and bag each having perforations adjacent the end thereof with the perforations in the tube offset relative to the perforations in the bag.

*7. A partially completed re-freezable refrigerating unit adapted for shipment and subsequent addition of a freezable liquid comprising a liquid impervious container having a mouth opening thereinto, a mass of dry material having liquid retentive properties disposed in said container and constituting a permanently non-consumable part of said unit, and reopenable means for normally retaining the mouth of said container in closed condition.*

*8. A partially completed re-freezable refrigerating unit adapted for shipment and subsequent addition of a freezable liquid comprising a liquid impervious container having a mouth opening thereinto, a mass of comminuted dry material having liquid immobilizing properties disposed in and partially filling said container and constituting a permanently non-consumable part of said unit, and reopenable means for normally maintaining the mouth of said container in closed condition.*

*9. A partially completed re-freezable refrigerating unit adapted for shipment and subsequent addition of a freezable liquid comprising a flexible liquid impervious bag having a mouth opening thereinto, a mass of dry comminuted dry material having liquid immobilizing properties disposed in and partially filling said bag and constituting a permanently non-consumable part of said unit, and reopenable means for releasably securing the mouth of said bag closed against the loss of contents therefrom.*

*10. The steps in the method of preparing and marketing a refreezable unit comprising, placing a mass of dry material having liquid retentive properties, in a liquid impervious container having a mouth opening thereinto, said material constituting a permanently non-consumable part of said unit, closing said container at its mouth opening, and then shipping the said unit in its dry form to its region of use, subsequently reopening said container and adding such freezable liquid to said container for retention therein by said material, then reclosing said container in a liquid tight manner.*

*11. The steps in the method of preparing and marketing a refreezable unit comprising, placing a mass of dry material having liquid retentive properties, in a liquid impervious container having a mouth opening thereinto, said material constituting a permanently non-consumable part of said unit, closing said container at its mouth opening, shipping the said unit in its dry form to its region of use, subsequently reopening said container at its mouth opening, and adding such freezable liquid to said container for retention therein by said material, and then reclosing said container in a liquid tight manner.*

References Cited in the file of this patent or the original patent

UNITED STATES PATENTS

| | | |
|---|---|---|
| 2,014,245 | Donahoe | Sept. 10, 1935 |
| 2,015,199 | Sparks et al. | Sept. 24, 1935 |
| 2,147,117 | Bensel | Feb. 14, 1939 |
| 2,154,933 | Hadsell | Apr. 18, 1939 |
| 2,177,919 | Vogt | Oct. 31, 1939 |
| 2,210,946 | Moore | Aug. 13, 1940 |
| 2,298,545 | Waters | Oct. 13, 1942 |
| 2,594,672 | Moore | Apr. 29, 1952 |